(12) United States Patent
Gapp et al.

(10) Patent No.: US 10,765,182 B2
(45) Date of Patent: Sep. 8, 2020

(54) DECORATIVE COMPOSITE BODY HAVING AN ELECTRICALLY CONDUCTIVE LAYER AND AN ELECTRONIC SENSOR

(71) Applicant: D. Swarovski KG, Wattens (AT)

(72) Inventors: Christof Gapp, Aldrans (AT); Martin Scholz, Wattens (AT); Annemarie Leber, Fügen (AT); Mathias Mair, Völs (AT); Franz Lexer, Axams (AT); Ernst Altenberger, Kolsass (AT)

(73) Assignee: D. Swarovski KG, Wattens (AT)

( * ) Notice: Subject to any disclaimer, the term of this patent is extended or adjusted under 35 U.S.C. 154(b) by 0 days.

(21) Appl. No.: 16/066,339

(22) PCT Filed: Dec. 19, 2016

(86) PCT No.: PCT/EP2016/081773
§ 371 (c)(1),
(2) Date: Jun. 27, 2018

(87) PCT Pub. No.: WO2017/118567
PCT Pub. Date: Jul. 13, 2017

(65) Prior Publication Data
US 2019/0000196 A1    Jan. 3, 2019

(30) Foreign Application Priority Data

Jan. 5, 2016 (EP) .................................... 16150240

(51) Int. Cl.
*A44C 15/00* (2006.01)
*G06F 3/0354* (2013.01)
*A44C 17/00* (2006.01)

(52) U.S. Cl.
CPC ............ *A44C 15/00* (2013.01); *A44C 17/007* (2013.01); *A44C 17/008* (2013.01); *G06F 3/03547* (2013.01)

(58) Field of Classification Search
CPC ..... A44C 15/00; A44C 17/007; A44C 17/008; G06F 3/03547
See application file for complete search history.

(56) References Cited

U.S. PATENT DOCUMENTS 1,812,367 A * 6/1931 Pief ...................... G04B 39/008
                                                    359/440
4,887,886 A * 12/1989 Shimizu ................ C23C 14/025
                                                    359/589

(Continued)

FOREIGN PATENT DOCUMENTS

CN    1286418 A    3/2001
CN    100478293 C    4/2009

(Continued)

OTHER PUBLICATIONS

Sophia Kruger; International Search Report and Written Opinion; International Application No. PCT/EP2016/081773; dated Mar. 21, 2017; European Patent Office; Rijswijk, Netherlands.

(Continued)

*Primary Examiner* — Mihir K Rayan
(74) *Attorney, Agent, or Firm* — Stevens & Showalter, LLP

(57) ABSTRACT

Proposed is a decorative element containing
(a) a gemstone,
(b) an electrically conductive layer on at least a partial area of the gemstone; and
(c) an electronic sensor.

19 Claims, 3 Drawing Sheets

(56) References Cited

U.S. PATENT DOCUMENTS

Figure 1:
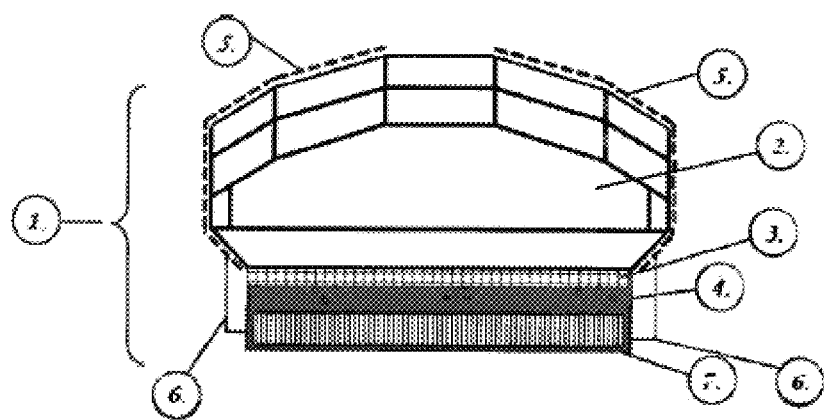

| | | | |
|---|---|---|---|
| 7,247,568 B2 | 7/2007 | Grupp et al. | |
| 7,712,954 B2* | 5/2010 | Bourban | G04G 21/08 368/294 |
| 7,932,893 B1 | 4/2011 | Berthaud | |
| 9,733,700 B2* | 8/2017 | Song | G06F 3/0338 |
| 2006/0092177 A1* | 5/2006 | Blasko | G04G 21/08 345/619 |
| 2006/0280040 A1 | 12/2006 | Bourban et al. | |
| 2011/0007035 A1* | 1/2011 | Shai | G06F 3/0338 345/179 |
| 2015/0313329 A1* | 11/2015 | Flanery | F21V 23/0471 63/1.11 |
| 2016/0098120 A1* | 4/2016 | Miyake | G06F 3/044 345/174 |
| 2016/0239083 A1* | 8/2016 | Cheng | G06F 3/014 |
| 2016/0292563 A1* | 10/2016 | Park | G06F 3/04883 |
| 2016/0342175 A1* | 11/2016 | Zacharias | G06F 1/263 |
| 2017/0012925 A1* | 1/2017 | Tekin | H04L 51/32 |
| 2017/0229596 A1* | 8/2017 | Mair | A44C 5/0007 |
| 2017/0303646 A1* | 10/2017 | Bricken | H04R 1/028 |
| 2019/0008242 A1* | 1/2019 | Gapp | G06F 3/044 |

FOREIGN PATENT DOCUMENTS

| | | |
|---|---|---|
| CN | 100585518 C | 1/2010 |
| CN | 102301497 A | 12/2011 |
| CN | 204682733 U | 10/2015 |
| CN | 204734472 U | 11/2015 |
| EP | 1544178 A1 | 6/2005 |
| FR | 1221561 A | 6/1960 |
| WO | 2010075599 A1 | 7/2010 |

OTHER PUBLICATIONS

Sophia Kruger; European Search Report; European Patent Application No. 16150240.6; dated Jun. 24, 2016; European Patent Office; Munich, Germany.

He Yihong; First Office Action; Chinese Application No. 201680077950.1; dated Nov. 6, 2019; China National Intellectual Property Administration; Beijing, China.

Office Action; dated May 18, 2020; Taiwan Application No. 105141049; Taiwan Intellectual Property Office; Taipei, Taiwan, R.O.C.

\* cited by examiner

DECORATIVE COMPOSITE BODY HAVING AN ELECTRICALLY CONDUCTIVE LAYER AND AN ELECTRONIC SENSOR

FIELD OF THE INVENTION

The invention relates to a decorative element containing a gemstone and an electrically conductive layer on at least a partial area of the gemstone. The decorative element is suitable for electronic function control.

BACKGROUND ART

To date, gemstones have been employed almost exclusively for purely aesthetic purposes in accessories and on textiles, but hardly had any functional effect. In the field of wearable electronics (so-called "wearable technologies"), a market with enormous growth opportunities, they are lacking, because this field is associated by the users with functionality rather than decoration. The use of functional gemstones is generally conceivable wherever functionality and aesthetics are required, but especially in this case, the function control of electronic devices is a challenge. Touch-sensitive electronic sensors, such as those known from touchscreens, enable a comfortable function control of electronic devices using a finger or stylus. The input interface of an electronic device is the device portion by the touch of which a function is triggered. Gemstones serving as an input interface of devices and enabling an exact touch-sensitive handling of the devices are lacking.

The patent specification U.S. Pat. No. 7,932,893 describes a watch with touch-sensitive sensors serving to control a computer cursor.

The patent specification U.S. Pat. No. 6,868,046 discloses a watch with capacitive keys. The capacitive keys are operated manually using a finger and serve to control the hands of the watch.

WO2010/075599A1 describes a body made of a transparent material coated with a transparent electrically conductive layer. With the transparent electrically conductive layer, a contact to an inorganic semiconductor chip, an LED, is created.

US2006/0280040A1 discloses a watch in which a transparent electrically conductive layer is coated on the inside of the watch glass, and enamel is coated on the edge. This structure is supposed to avoid shortcuts.

EP 1 544 178 A1 describes a transparent element with transparent electrodes and a multi-layer structure. One of the layers is a transparent electrically conductive layer. The layers are coated on top of one another and also serve as an antireflection coating.

FR 1221561 discloses a decorative element that can be caused to light up by a phosphorescent material.

To date, there has been a lack of any technical solution of adapting gemstones for being suitable as a function control of electronic devices. It is the object of the present invention to provide a decorative element that enables function control of electronic devices.

DESCRIPTION OF THE INVENTION

A first subject matter of the present invention relates to a decorative element containing
(a) a gemstone,
(b) an electrically conductive layer on at least a partial area of the gemstone; and
(c) an electronic sensor.

The present invention further relates to a process for the function control of electronic devices, comprising the following steps:
(a) providing a gemstone coated with an electrically conductive layer;
(b) touching the electrically conductive layer with a finger or stylus; and
(c) triggering a function of the evaluation sensor system by the touch.

Gemstones coated with an electrically conductive layer can be used for the function control of electronic devices, for example, after being adhesively bonded to capacitive touchscreens, touchpads or trackpads, as are known, for example, from smartphones or laptops. Preferably, the electronic sensors for function control are contained in said touchscreens, touchpads or trackpads. In further possible applications preferred according to the invention, the electrically conductive layer is directly connected with the evaluation sensor system (see below). Decorative elements having such a structure are suitable for a wide range of applications. In jewels, for example, bracelets, rings, necklaces or brooches, that contain electronic components/devices, the decorative element according to the invention preferably comprises an additional electronic sensor for function control. The invention also relates to objects containing a decorative element according to the invention. For example, the decorative element may be advantageously incorporated in so-called "activity trackers", to which the invention thus also relates. Further possible applications are mentioned in the following. The present invention also relates to the use of the decorative element according to the invention for the function control of electronic devices.

Surprisingly, it has been found that a combination of a gemstone with an electrically conductive layer and an electronic sensor as an input interface is suitable for a wide variety of purposes, for example, for controlling the brightness of a display. The combination according to the invention provides for a wide variety of possible applications in the design and technology fields, both as an input interface for function control and as a gemstone. A gemstone with an electrically conductive layer enables the function control of electronic devices by touching the electrically conductive layer with a finger or an electrically conductive stylus. Layers made of a wide variety of materials may be applied as the electrically conductive layer, for example, metallic layers or transparent conductive oxide layers are suitable (see below). Preferably, the electrically conductive layer is transparent in order that the color of the gemstone can be perceived. Preferably according to the invention, the gemstone is transparent in order to obtain brilliancy. From a brilliant appearance, gemstones obtain a particularly aesthetic effect. A combination of a transparent electrically conductive layer and a transparent gemstone is particularly preferred according to the invention.

Preferably, a wavelength-selective layer is additionally applied to at least a partial area of the gemstone. The combination of a transparent gemstone with a transparent electrically conductive layer and a wavelength-selective layer improves the brilliancy of the gemstone. The term "transparency" means the ability of matter to transmit electromagnetic waves (transmission). If a material is transparent for incident electromagnetic radiation (photons) of a more or less wide frequency range, the radiation can penetrate the material almost completely, i.e., it is hardly reflected and hardly absorbed. Preferably according to the invention, "transparency" means a transmission of at least 60% of the incident light, preferably more than 70%, more preferably more than 80%. A so-called mirror coating may also be applied to gemstones. A mirror coating is, for example, a silver layer applied by a wet chemical process. If appropriate, a mirror coating may also serve as a wavelength-selective layer.

Preferably according to the invention, facetted gemstones are employed. According to the invention, "faceting" means the design of a surface of a gemstone with polygons or so-called n-gons (n≥3); facets are usually obtained by grinding a rough crystal, but are also available by pressing methods.

Preferably according to the invention, the gemstones have a plano-convex or plano-convex-concave geometry, since the gemstones can be applied very readily because of the planar region. The curved convex or convex-concave region facilitates a comfortable operation of the decorative component, and the aesthetic of the decorative element is supported. The terms "convex" and "concave" relate to an imaginary enveloping area above or below the facets, and the definitions are to be understood by analogy with lenses in optics. The convex and concave regions may be either symmetrical or asymmetrical.

Possible structures of the decorative element (composite body) are shown in FIGS. 1), (2a) to (2d), and (3a) to (3b), the reference symbols having the following meanings:
(1) decorative element;
(2) gemstone;
(3) wavelength-selective coating;
(4) adhesive;
(5) electrically conductive layer;
(5.1), (5.2), (5.3), (5.4), (5.5) and (5.6) are partial areas with an electrically conductive layer;
(6) electrically conductive connection;
(7) evaluation sensor system;
(8) contacting by pogo pin;
(9) contacting by gemstone setting;
(10) contacting by electrically conductive adhesive;
(11) contacting by electrically conductive film, metallic mirroring, or electrically conductive elastomer;
(12) touch with a finger or stylus;
(13) movement in the direction of the arrow;
(14) movement in the altered direction of the arrow.

Preferably, the decorative element comprises a transparent faceted gemstone of glass and a transparent electrically conductive layer. Particularly preferred is an embodiment of the decorative element with a transparent faceted gemstone of glass with indium tin oxide as a transparent electrically conductive layer, and additionally a wavelength-selective layer composed of a sequence of $SiO_2$ and $TiO_2$ layers. In a more particularly preferred embodiment of the decorative element, an electronic sensor is additionally contained.

Preferably according to the invention, the electrically conductive layer (see below) is applied to the preferred convex/concave curved surface of the gemstone (FIG. 1). In FIG. 1, the layer (5) is drawn in discontinuity, because it may also be deposited in spatially separated regions according to the invention (see below). The wavelength-selective layer (see below) is preferably provided directly on the planar side opposite to the convex/concave curved surface, i.e., on the backside of the plano-convex-concave or plano-convex gemstone (FIG. 1).

Connecting the decorative element with an evaluation sensor system (see below) enables the function control of electronic devices. Touching the electrically conductive layer with a finger or an electrically conductive stylus triggers a signal that serves for the function control of electronic devices. Especially for wearable electronic devices, the function control of the electronic devices is a challenge because of their small size. The decorative element according to the invention combines a high brilliancy with the function of an input interface. However, the decorative element according to the invention is not limited to the field of wearable electronic devices. Its use is conceivable wherever functionality and aesthetics are desirable. For example, the use of the decorative element as a light switch is conceivable. In such a case, the light is switched on or off by touching the decorative element, and a dimming function is also possible. Generally, functions of electronic devices, such as television sets, radios or media players, can be controlled by the decorative element.

Another application of the decorative element is represented, for example, by rings and earrings, in which it serves as a gemstone and at the same time enables the function control of an electronic device. Thus, for example, a ring equipped with the decorative element according to the invention can be employed for the measurement of particular body functions. A wide variety of function control possibilities are conceivable, for example, a switching on and off function, or possible switching between different operation modes.

The decorative element according to the invention may also be employed for the function control for so-called switchable effects, for example, for a color change, for example, by means of RGB-LEDs, a gemstone or, for example, the display functions of a so-called smart watch. Switchable effects can be controlled with the decorative element and a suitable evaluation sensor system (see below) by touching the electrically conductive layer of the decorative element, for example, with a finger. Touching the electrically conductive layer of the decorative element may cause, for example, the color change of a gemstone.

The decorative element or a plurality of decorative elements may be integrated, for example, into a bracelet, in order to control the functions of, for example, a smart watch or an activity sensor (activity tracker). When a plurality of decorative elements is provided, the individual decorative elements can be employed by themselves for function control. The decorative elements can also be connected with each other, for example, by cables, for function control, so that only the successive touching of several gemstones causes a function (see below), for example, the brightness regulation of a display, and the volume regulation of speakers.

Gemstone

The gemstone can be made of a wide variety of materials, for example, glass, plastic, ceramic or gems or semi-precious stones. Gemstones made of glass or plastic are preferred according to the invention, because they are lowest cost and are most readily provided with facets. The use of glass is particularly preferred according to the invention. Faceted gemstones of glass are particularly preferred. The gemstones preferably comprise convex curved or convex-concave curved regions. This means that concave curved regions may also be present in addition to the convex curved regions on the faceted side. The side of the gemstone opposite the faceted side is either planar (preferably) or else concave. Particularly preferred are faceted gemstones of convex, especially plano-convex, geometry.

Glass

The invention is not limited in principle with respect to the composition of the glass. "Glass" means a frozen supercooled liquid that forms an amorphous solid. According to the invention, both oxidic glasses and chalcogenide glasses, metallic glasses or non-metallic glasses can be employed.

Oxynitride glasses may also be suitable. The glasses may be one-component (e.g., quartz glass) or two-component (e.g., alkali borate glass) or multicomponent (soda lime glass) glasses. The glass can be prepared by melting, by sol-gel processes, or by shock waves. The methods are known to the skilled person. Inorganic glasses, especially oxidic glasses, are preferred according to the invention. These include silicate glasses, borate glasses or phosphate glasses. Lead-free glasses are particularly preferred.

For the preparation of the gemstones, silicate glasses are preferred. Silicate glasses have in common that their network is mainly formed by silicon dioxide ($SiO_2$). By adding further oxides, such as alumina or various alkali oxides, alumosilicate or alkali silicate glasses are formed. If phosphorus pentoxide or boron trioxide are the main network formers of a glass, it is referred to as a phosphate or borate glass, respectively, whose properties can also be adjusted by adding further oxides. These glasses can also be employed according to the invention. The mentioned glasses mainly consist of oxides, which is why they are generically referred to as oxidic glasses.

In a preferred embodiment according to the invention, the glass composition contains the following components:
(a) about 35 to about 85% by weight $SiO_2$;
(b) 0 to about 20% by weight $K_2O$;
(c) 0 to about 20% by weight $Na_2O$;
(d) 0 to about 5% by weight $Li_2O$;
(e) 0 to about 13% by weight ZnO;
(f) 0 to about 11% by weight CaO;
(g) 0 to about 7% by weight MgO;
(h) 0 to about 10% by weight BaO;
(i) 0 to about 4% by weight $Al_2O_3$;
(j) 0 to about 5% by weight $ZrO_2$;
(k) 0 to about 6% by weight $B_2O_3$;
(l) 0 to about 3% by weight F;
(m) 0 to about 2.5% by weight Cl.

All stated amounts are to be understood as giving a total sum of 100% by weight, optionally together with further components. The faceting of the gemstones is usually obtained by grinding and polishing techniques that are adequately familiar to the skilled person.

For example, a lead-free glass, especially the glass used by the company Swarovski for Chessboard Flat Backs (catalogue No. 2493), which shows a transmission of >95% in the range of 380-1200 nm, is suitable according to the invention.

Plastic

As another raw material for the preparation of the gemstone (a), plastics can be employed. Transparent plastics are preferred according to the invention. Among others, the following materials are suitable according to the invention:
acrylic glass (polymethyl methacrylates, PMMA),
polycarbonate (PC),
polyvinyl chloride (PVC),
polystyrene (PS),
polyphenylene ether (PPO),
polyethylene (PE),
poly-N-methylmethacrylimide (PMMI).

The advantages of the plastics over glass reside, in particular, in the lower specific weight, which is only about half that of glass. Other material properties may also be selectively adjusted. In addition, plastics are often more readily processed as compared to glass. Drawbacks include the low modulus of elasticity and the low surface hardness as well as the massive drop in strength at temperatures from about 70° C., as compared to glass. A preferred plastic according to the invention is poly-N-methylmethacrylimide, which is sold, for example, by Evonik under the name Pleximid® TT70. Pleximid® TT70 has a refractive index of 1.54, and a transmittance of 91% as measured according to ISO 13468-2 using D65 standard light.

Geometry

The geometric design of the gemstone is not limited in principle and predominantly depends on design aspects. The gemstone is preferably square, rectangular or round. Preferably according to the invention, the gemstone is faceted. The gemstone preferably has a convex, especially a plano-convex geometry. Preferably, the gemstone contains a plurality of facets on the preferably convex-curved side.

The type of faceting is closely related to the geometry of the gemstone. In principle, the geometric shape of the facets is not limited. Preferred according to the invention are square or rectangular facets, especially in combination with a gemstone with square or rectangular dimensions and a plano-convex geometry. However, faceted gemstones that are round may also be used.

Sensors

The function control of electronic devices using a finger or electrically conductive stylus is efficiently enabled by touch-sensitive electronic circuitry, as employed, for example, for touchscreens. Different electronic sensors are suitable for touch-sensitive electronic circuitry. Preferably according to the invention, resistive or capacitive sensors, more preferably capacitive sensors, are used as electronic sensors. Capacitive sensors include an electronic component with a capacitor and an input interface. In the decorative element, the input interface is the gemstone with the electrically conductive layer. Upon touching the input interface with a finger or an electrically conductive stylus, the capacitor changes its capacitance. This change is detected electronically and processed further by means of further electronic control elements. The capacitive or resistive sensors and the further processing electronic control elements are referred to as "evaluation sensor system". Preferably, the electrically conductive layer is connected with the evaluation sensor system. This enables a very good operability of the decorative element.

The embodiments of capacitive and resistive sensors are adequately familiar to the skilled person. Resistive sensors comprise an electronic component with two separate electric contact surfaces. The two separate electric contact surfaces are connected by the gemstone coated with the electrically conductive layer. In the resistive sensors, touching the coated gemstone with a finger or with an electrically conductive stylus results in a current flow. The current flow can be detected electronically. The detection of the current flow as a control signal enables the function control of electronic devices. A Darlington transistor, for example, is suitable as a resistive sensor.

Figure 2A:
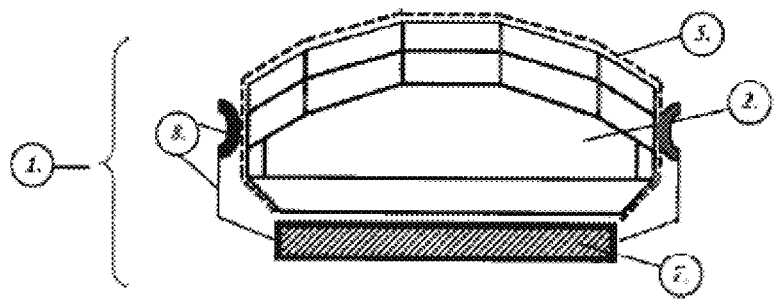
Figure 2B:
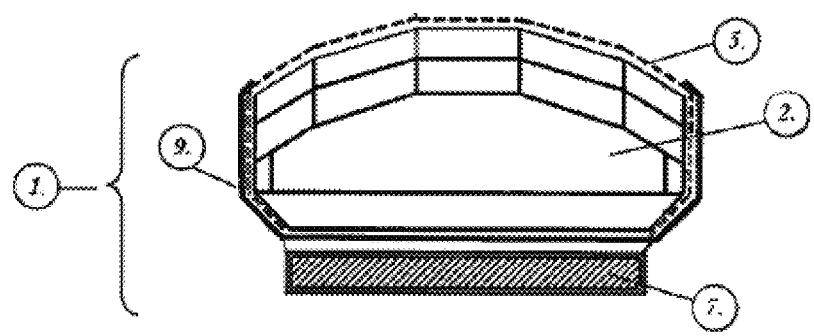

The connection between the input interface and the sensors is preferably created by an electrically conductive contact (FIGS. 1 and 2a to 2d). This has the advantage that the function control is not adversely affected. According to the invention, an electrically conductive contact is possible, for example, by using a pogo pin (FIG. 2a). The pogo pin (8) creates an electrically conductive connection between the electrically conductive layer(s) on the gemstone and the sensor(s) by spring pressure onto the electrically conductive layer. Alternatively, an electrically conductive gemstone setting may also be used for the contacting (FIG. 2b). For example, an electrically conductive portion of the gemstone setting (9) serves for holding the gemstone. The connection between the electrically conductive layer and the electrically conductive portion of the gemstone setting creates the contacting.

Alternatively, an electrically conductive adhesive (FIG. 2c), for example, 3M™ 5303 R-25μ/5303 R-50μ from the 3M company, an electrically conductive adhesive sheet (FIG. 2d), for example, 3M® Anisotropic Conductive Film 7379 from the 3M company, or an electrically conductive elastomer (FIG. 2d), for example, Silver Zebra® Connector from the company Fuji Polymer Industries Co. Ltd., for example, are suitable as the electrically conductive contacting. The electrically conductive connection may also be created by a wire connection. The possibilities of electrically conductive connection are adequately familiar to the skilled person.

Push-Type and Slide-Type Input

Figure 3A:
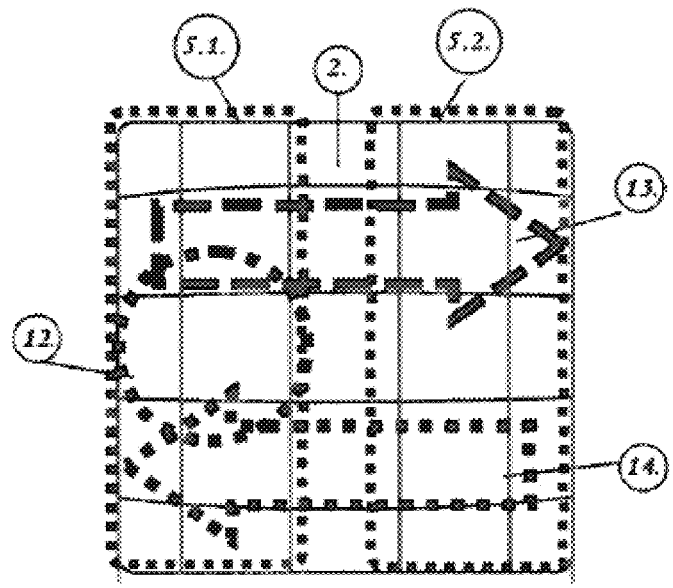
Figure 3B:
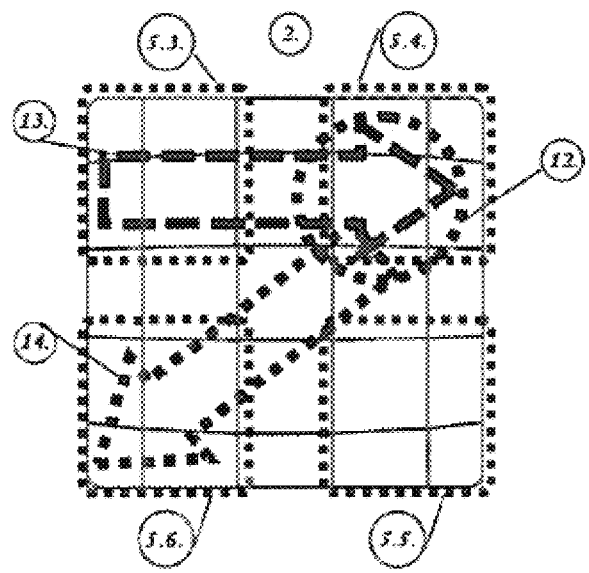

The function control by means of an electrically conductive layer is possible in different ways. One embodiment is push-type input. In push-type input, a function of the evaluation sensor system, for example, the switching on or off of an electronic device, is triggered by the touch of the electrically conductive layer with a finger or an electrically conductive stylus. For push-type input, it is not required that the whole surface of the gemstone is coated with the electrically conductive layer. The electrically conductive layer may also be coated only on a partial area of the gemstone surface (FIGS. 3a and 3b).

For example, if the electrically conductive layer is applied to at least two electrically separated regions of the gemstone surface (dashed rectangles in FIGS. 3a and 3b) and if the separated regions cause different functions, then electrically conductive contacting between the regions of the electrically conductive layer and the evaluation sensor system is required (FIG. 1). For example, one region enables the electronic device to be switched on and off, while the other region enables switching between the operational modes, for example. This results in a larger number of possibilities for function control. Since decorative elements are often incorporated in a setting, the connection to the electrically conductive contacting can be effected, for example, in the setting (see above). The different possibilities of preparing an electrically conductive connection are adequately familiar to the skilled person (see above).

Slide-type input is another possibility of function control. In this type of input, it is required that the electrically conductive layer is applied to at least two separated regions of the curved faceted surface (dashed rectangles 5.1 and 5.2 in FIG. 3a as well as 5.3, 5.4, 5.5 and 5.6 in FIG. 3b). Function control is effected by a predefined succession of touches of the separated regions with a finger of with an electrically conductive stylus (12 in FIGS. 3a and 3b). The finger or electrically conductive stylus moves in the direction of the arrow (13 and 14, respectively, in FIGS. 3a and 3b). This comfortable type of input is also known from smartphones. The electrically conductive connection between the electrically conductive layer and the evaluation sensor system can be effected in different ways that are adequately familiar to the skilled person (see above).

Therefore, in both push-type and slide-type input, the electrically conductive layer in at least two separated regions is of advantage for a comfortable function control. Therefore, the electrically conductive layer is preferably applied to at least two separated regions of the curved faceted gemstone surface. Further possibilities of function control are obtained if the push-type and slide-type input is combined in one decorative element, for example, slide-type input with the space-separated regions 5.3, 5.4, 5.6, and push-type input with the region 5.5 (FIG. 3b).

Decorative elements according to the invention that have push-type and/or slide-type input can be employed, for example, in bracelets, rings, necklaces, brooches, pockets, headsets or activity trackers. The jewels, such as bracelets, rings, necklaces or brooches, either contain themselves electronic devices with switchable functions, such as light control capabilities, or are used as a remote control for smartphones, headsets or activity trackers, for example. In a smartphone, for example, a function control is possible in which calls are accepted or rejected by touching the decorative element, volume regulation is conceivable for a headset, and switching between the operational modes in an activity tracker. The fields of application and the possibilities of function control are mentioned merely in an exemplary way, while a wide variety of controllable functions can be realized.

Electrically Conductive Layer

In connection with an evaluation sensor system, the electrically conductive layer enables the function control of electronic devices. Preferably according to the invention, it is applied to the curved surface of the gemstone (FIG. 1), in order to enable a simple touch with a finger or with an electrically conductive stylus. The transmission properties of the electrically conductive layer affect the brilliancy of the decorative element. Therefore, the electrically conductive layer is preferably transparent within a range of 380 to 780 nm.

Because of their electrical conductivity, metallic layers are suitable as the electrically conductive layer. They can be deposited on the gemstone by suitable coating methods, for example, sputtering (see below). Metals like Cr, Ti, Zr, V, Mo, Ta and W are suitable for this. Metals like Al, Cu or Ag are less advantageous as the electrically conductive layer because of their lower chemical stability, but still suitable in principle. Chemical compounds with electrical conductivity properties may also be used as the electrically conductive layer, particularly chemical nitride compounds, for example, TiN, TiAlN or CrN. The metallic layers and electrically conductive chemical compounds are adequately familiar to the skilled person.

Transparent electrically conductive oxide layers can also be employed as the electrically conductive layer. They are well known to the skilled person. Transparent electrically conductive oxide layers have a good mechanical abrasion resistance, a good chemical resistance, and a good thermal stability. They contain semiconductive oxides. The semiconductive oxides obtain metallic conductivity from a suitable n doping. The transparent electrically conductive oxide layers are important components for transparent electrodes, for example, in flat screens or thin layer solar cells.

Indium tin oxide is the transparent electrically conductive oxide layer that is most readily technically accessible. It is a commercially available mixed oxide of about 90% $In_2O_3$ and about 10% $SnO_2$. Indium tin oxide has very good transmission properties, a very good mechanical abrasion resistance, and a very good chemical resistance. Preferably according to the invention, indium tin oxide is used as the electrically conductive layer, and in particular, indium tin oxide is applied at a layer thickness of at least 4 nm to obtain electrical conductivity.

Aluminum-doped zinc oxide as the transparent electrically conductive oxide layer has good transmission properties and a good mechanical abrasion resistance. It is employed on an industrial scale, for example, in the field of solar technology. Further suitable transparent electrically conductive oxide layers include doped zinc oxides, such as gallium zinc oxide or titanium zinc oxide, doped tin oxides, such as fluorine-doped tin oxide, antimony tin oxide, or tantalum tin oxide, or doped titanium niobium oxide.

Preferably according to the invention, the electrically conductive layer comprises at least one component selected from the group of Cr, Ti, Zr, indium tin oxide, aluminum-doped zinc oxide, gallium zinc oxide, titanium zinc oxide, fluorine-doped tin oxide, antimony tin oxide, tantalum tin oxide, or titanium niobium oxide, or any combination of these components in any sequence of layers. More preferably, indium tin oxide is deposited for the decorative element according to the invention.

The methods for preparing electrically conductive layers are adequately familiar to the skilled person. These include, without limitation, PVD (physical vapor deposition) and CVD (chemical vapor deposition) methods. PVD methods are preferred according to the invention.

The PVD methods are a group of vacuum-based coating methods or thin layer technologies that are adequately familiar to the skilled person, being employed, in particular, for the coating of glass and plastic in the optical and jewelry industries. In the PVD process, the coating material is transferred into the gas phase. The gaseous material is subsequently led to the substrate to be coated, where it condenses and forms the target layer. With some of these PVD methods (magnetron sputtering, laser beam evaporation, thermal vapor deposition, etc.), very low process temperatures can be realized. In this way, a large number of coating materials can be deposited in a very pure form in thin layers. If the process is performed in the presence of reactive gases, such as oxygen, metal oxides, for example, may also be deposited. A preferred method according to the invention is a coating process by sputtering, for example, with the device Radiance from the company Evatec. Depending on the requirements of function an optical appearance, a typical layer system can consist of only one layer, but also of a large number of layers.

For the preparation of the separated regions of the electrically conductive layer on the curved faceted surface (see above), the gemstone is covered by a mask. The mask leaves the regions of the curved faceted surface exposed, on which the electrically conductive layer is deposited. Covers of plastic or metal are suitable as the mask, for example. An alternative possibility for preparing the separated regions of the electrically conductive layer on the curved faceted surface is cutting through this layer by means of a laser, for example, an Nd:YAG laser or an ultrashort pulse laser. The use of a laser enables a very precise preparation of the separated regions. The separation of the electrically conductive layer may also be effected by etching. Etching includes the application of a mask to the electrically conductive layer, for example, by using a photoresist. The etching creates the desired spatially separated regions of the electrically conductive layer. The photoresist is subsequently removed, for example, by wet chemical methods. The methods are adequately familiar to the skilled person.

Wavelength-Selective Layer

The wavelength-selective layer increases the brilliancy of the decorative element. The optional wavelength-selective layer is preferably provided between the gemstone and the evaluation sensor system. Preferably according to the invention, it will be realized in two different ways: by a wavelength-selective film or a wavelength-selective coating, which is prepared by PVD, CVD or wet-chemical methods. However, a wavelength-selective layer may also be obtained from a microstructured surface. The methods of microstructuring are well known to the skilled person.

As a result of the reflection of a defined range (=filtering) of the visible spectrum, the optical element gains brilliance and appears in a particular color to the viewer. The brilliance is additionally supported by the faceting of the gemstone. In a preferred embodiment of the invention, the wavelength-selective layer reflects a fraction of the light in the range of 380 to 780 nm, i.e., predominantly in the visible range.

The wavelength-selective layer shows angle-dependent reflection (FIGS. 5a and 5b). The reflection interval is shifted as a function of the angle of incidence of the light onto the decorative element. Depending on the position of the decorative element, different color fractions are reflected.

In order to enable bonding of the individual components of the decorative element with UV-curing adhesives, the wavelength-selective layer is preferably at least partially transparent to UV light.

Preferably according to the invention, the wavelength-selective layer is a dielectric in order to enable unrestricted function control for separated regions of the electrically conductive layer (see above). If the wavelength-selective layer is electrically conductive, fault currents may occur.

According to the invention, the wavelength-selective layer could be applied on the gemstone surface between the electrically conductive layer and the gemstone surface in principle; however, this is one of the less preferred embodiments because of a possible reduction of brilliancy. If the wavelength-selective layer is applied on the planar side of the gemstone, there are multiple reflections within the gemstone, which lead to an increase of brilliancy.

Wavelength-Selective Films

Wavelength-selective films are commercially available under the designation "Radiant Light Film". These are multilayered polymeric films that can be applied to other materials. These optical films are Bragg mirrors and reflect a high proportion of the visible light and produce brilliant color effects. A relief-like microstructure within a range of several hundred nanometers reflects the different wavelengths of the light, and interference phenomena occur, the colors changing as a function of the viewing angle.

Particularly preferred films according to the invention consist of multilayered polymeric films whose outermost layer is a polyester. Such films are sold, for example, by the company 3M under the name Radiant Color Film CM 500 and CM 590. The films have a reflection interval of 590-740 nm or 500-700 nm.

The wavelength-selective film is preferably bonded with the gemstone by means of an adhesive. When the electrically conductive layer and the gemstone are transparent, the adhesive should also be transparent. In a preferred embodiment, the refractive index of the adhesive deviates by less than ±20% from the refractive index of the transparent gemstone. In a particular preferred embodiment, the deviation is <10%, even more preferably <5%. This is the only way to ensure that reflection losses because of the different refractive indices can be minimized. The refractive indices can also be matched to one another by roughening the respective boundary layers (moth eye effect). So-called "moth eye surfaces" consist of fine nap structures that change the refraction behavior of the light, not suddenly, but continuously in the ideal case. The sharp boundaries between the different refractive indices are removed thereby, so that the transition is almost fluent, and the light can pass through unhindered. The structural sizes required for this must be smaller than 300 nm. Moth eye effects ensure that the reflection at the boundary layers is minimized, and thus a higher light yield is achieved in the passage through the boundary layers.

Adhesives that can be cured by means of UV radiation are preferred according to the invention. Both the UV-curing adhesives and the methods for determining the refractive index are well known to the skilled person. Particularly preferred according to the invention is the use of acrylate adhesives, especially of modified urethane acrylate adhesives. These are sold by numerous companies, for example, by Delo under the designation Delo-Photobond® PB 437, an adhesive that can be cured by UV light within a range of 320-42 nm.

Wavelength-Selective Coating

The coating materials are well known to the skilled person. In a preferred embodiment of the invention, the wavelength-selective coating is a dielectric (see above). Dielectric coating materials can be applied to the gemstone by one of the common coating methods. Successive layers of different dielectric materials can also be applied. The methods of preparing coatings and the coatings themselves are adequately known to the skilled person. These include, among others, PVD (physical vapor deposition) methods, CVD (chemical vapor deposition) methods, paint-coating methods and wet chemical methods according to the prior art. PVD methods are preferred according to the invention (see above).

For the construction of a dielectric wavelength-selective coating according to the invention, the following coating materials are preferably suitable: $MgF_2$, $SiO_2$, $CeF_3$, $Al_2O_3$, $CeO_3$, $ZrO_2$, $Si_3N_4$, $Ta_2O_5$, $TiO_2$, or any combination of such compounds in any sequence of layers, a succession of $TiO_2$ and $SiO_2$ layers being particularly preferred. The desired degree of reflection and transmission can be adjusted by appropriately selecting the coating materials, number of layers and the layer thicknesses.

For the PVD layer production, a wide variety of commercial machines are available, for example, model BAK1101 from the company Evatec.

In the following, the invention will be illustrated further by means of Examples and Figures without being limited thereto. The Figures show the following objects:

FIG. 1: Structure of a decorative element. Electrically conductive layer in partial areas of the gemstone, and wavelength-selective coating on the planar side opposite the faceting.

FIG. 2a: Electrically conductive connection between the electrically conductive layer and the evaluation sensor system by a pogo pin.

FIG. 2b: Electrically conductive connection between the electrically conductive layer and the evaluation sensor system by an electrically conductive gemstone setting.

Figure 2C:
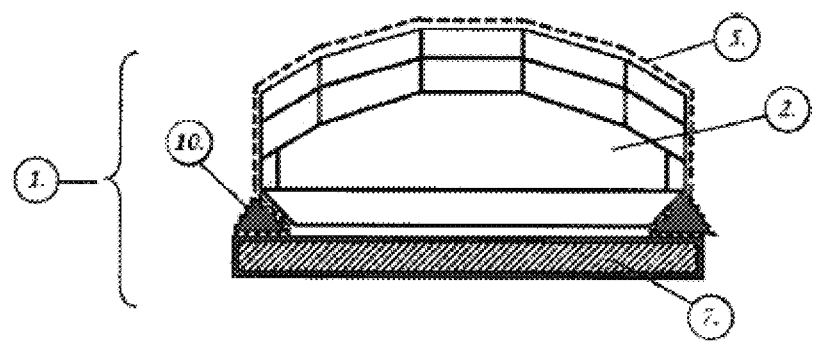

FIG. 2c: Electrically conductive connection between the electrically conductive layer and the evaluation sensor system by an electrically conductive adhesive.

Figure 2D:
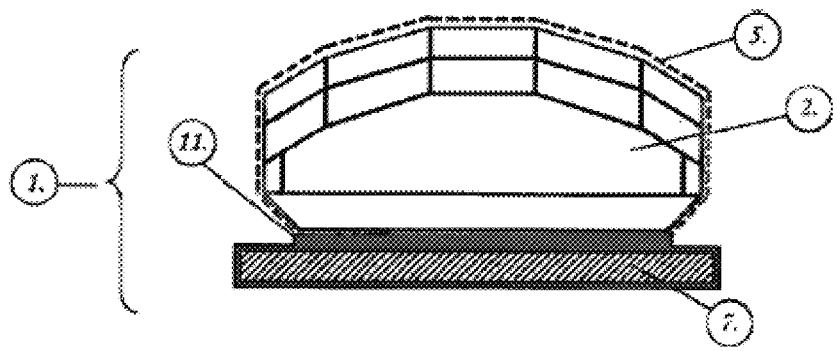

FIG. 2d: Electrically conductive connection between the electrically conductive layer and the evaluation sensor system by an electrically conductive film or electrically conductive elastomer.

FIG. 3a: Decorative element with two separated regions of the transparent electrically conductive layer for push-type or slide-type input.

FIG. 3b: Decorative element with four separated regions of the transparent electrically conductive layer for push-type or slide-type input.

INDUSTRIAL APPLICABILITY

The decorative elements according to the invention can be employed for the function control of numerous electronic devices.

Example According to the Invention

An example according to the invention with a gemstone and an electrically conductive layer was prepared.

Gemstone:

The non-mirrored Chessboard Flat Back 2493 (30 mm×30 mm) of the company D. Swarovski KG was used as a gemstone of glass.

Geometry:

The gemstone was a faceted solid with 30 mm edge length and a square base area with slightly rounded corners. The faceted upper part included convex curved areas. The total height of the solid was about 8 mm, the corner edge height was about 2.7 mm.

Transparent Electrically Conductive Layer:

The gemstone was coated with the transparent electrically conductive layer of indium tin oxide on the entire surface. The coating process was performed by sputtering with the PVD plant FHRline 400 of the company FHR.

In order to improve the electrical and chemical properties and the mechanical abrasion resistance, the gemstone was first treated by ion etching in the plant FHRline 400. Thereafter, the sample was heated at a temperature of about 550° C. for about 30 minutes in the same plant FHRline 400. This was followed by the coating of the optical element with indium tin oxide in the same plant FHRline 400, wherein the mixed oxide had a customary ratio of about 90% $In_2O_3$ to about 10% $SnO_2$. The pressure was about $3.3 \cdot 10^{-3}$ mbar, and the discharge power was about 1 kW. The layer thickness varied as a function of the surface geometry from about 140 nm to about 190 nm. The coating process was effected with using a protective gas of argon and 5 sccm $O_2$. Subsequently, the coated optical element was heated at a temperature of about 550° C. for about 20 minutes in the same plant FHRline 400.

Evaluation Sensor System and Structure of the Decorative Element:

The coated gemstone was connected on the backside by the pogo pin S7121-42R from the company Harwin Plc Europe with the circuit board Kingboard KB-6160 FR-4Y KB 1.55. The pogo pin S7121-42R was soldered with the circuit board. The distance between the circuit board and the coated backside of the gemstone was about 1.5 mm. The touch controller IQS228AS from the company Azoteq (Pty) Ltd. was used for function control. The touch controller IQS228AS was provided on the upper side of the circuit board between the gemstone and circuit board and was soldered with the circuit board. The touch controller IQS228AS was electrically connected with the pogo pin through a conducting path. The touch controller was supplied with power, and the signal of the touch controller transmitted, through a multi-pole cable. The structure was surrounded by a housing of polycarbonate of the type Makrolon® 2405 polycarbonate. The gemstone was connected at a distance of about 1.5 mm from the circuit board with the housing through the commercially available two-part epoxy resin adhesive 9030 CG 500 (A+B) 50 ml EUROPE/AMERICA, Material No. 5284198 from the company Swarovski. The housing had an inward running web of about 1.7 mm in order to enable a distance of the backside of the gemstone of about 1.5 mm from the circuit board, and the connection between the housing and gemstone by means of an adhesive. The multi-pole cable was led out of the housing through an opening in the housing.

The invention claimed is:

1. A decorative element comprising:
   (a) a gemstone comprising a front side and a back side opposite the front side,
   (b) an electrically conductive layer on at least a region of the front side of the gemstone;
   (c) an evaluation sensor system on an opposite side of the gemstone to the electrically conductive layer below the back side of the gemstone and coupled to the electrically conductive layer; and
   (d) an electrically conductive connection providing the coupling between the electrically conductive layer on the at least a region of the front side of the gemstone and the evaluation sensor system below the back side of the gemstone.

2. The decorative element according to claim 1, characterized in that said electrically conductive layer comprises at least one component selected from the group consisting of: Cr, Ti, Zr, indium tin oxide, aluminum-doped zinc oxide, gallium zinc oxide, titanium zinc oxide, fluorine-doped tin oxide, antimony tin oxide, tantalum tin oxide, and titanium niobium oxide, or any combination of these components in any sequence of layers.

3. The decorative element according to claim 2, characterized in that said electrically conductive layer is transparent.

4. The decorative element according to claim 1, characterized in that said electrically conductive layer is transparent.

5. The decorative element according to claim 1, characterized in that said electrically conductive layer is applied to at least two separate regions of the gemstone.

6. The decorative element according to claim 1, characterized in that said electronic sensor contains a capacitive or resistive sensor.

7. The decorative element according to claim 1, characterized in that said gemstone is made of glass or plastic.

8. The decorative element according to claim 1, characterized in that said gemstone has plano-convex or plano-convex-concave regions.

9. The decorative element according to claim 1, characterized in that said gemstone is faceted.

10. The decorative element according to claim 1, characterized in that a wavelength-selective layer is applied to at least a region of the gemstone.

11. The decorative element according to claim 10, characterized in that said wavelength-selective layer is a dielectric coating.

12. The decorative element according to claim 11, characterized in that said dielectric coating contains at least one metal compound.

13. The decorative element according to claim 12, wherein the dielectric coating has a structure comprising a succession of Sift and $TiO_2$ layers.

14. The decorative element according to claim 1, characterized in that said gemstone is transparent.

15. The decorative element according to claim 1, characterized in that:
   a) the gemstone comprises a faceted gemstone of glass; and
   b) the electrically conductive layer comprises an electrically conductive layer of indium tin oxide;
   c) wherein the decorative element further comprises a wavelength-selective layer with a structure comprising a succession of Sift and $TiO_2$ layers.

16. The decorative element according to claim 1, characterized in that the decorative element is for controlling the function of an electronic device.

17. The decorative element according to claim 1, characterized in that the electrically conductive layer is touch-sensitive and wherein the evaluation sensor system is configured to detect a touch of the electrically conductive layer.

18. The decorative element according to claim 1, characterized in that the decorative element is for controlling the function of an electronic device and the evaluation sensor system is configured to enable functional control of the electronic device when the electrically conductive layer is touched.

19. A process for controlling the function of electronic devices, comprising the following steps:
   (a) providing a gemstone comprising a front side and a back side opposite the front side, at least a region of the front side coated with an electrically conductive layer;
   (b) touching the electrically conductive layer with a finger or stylus;
   (c) triggering a function of an evaluation sensor system by the touch, wherein the evaluation sensor system is arranged on an opposite side of the gemstone to the electrically conductive layer below the back side of the gemstone; and
   (d) providing a coupling, via an electrically conductive connection, between the electrically conductive layer on the at least a region of the front side of the gemstone and the evaluation sensor system below the back side of the gemstone.

* * * * *